United States Patent
Mabile (10) Patent No.: US 10,132,199 B2
(45) Date of Patent: Nov. 20, 2018

(54) THERMAL TO MECHANICAL ENERGY CONVERSION METHOD USING A RANKINE CYCLE EQUIPPED WITH A HEAT PUMP

(71) Applicant: IFP Energies nouvelles, Rueil-Malmasion (FR)

(72) Inventor: Claude Mabile, Clamart (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 151 days.

(21) Appl. No.: 15/031,416

(22) PCT Filed: Sep. 17, 2014

(86) PCT No.: PCT/EP2014/069805
§ 371 (c)(1),
(2) Date: Apr. 22, 2016

(87) PCT Pub. No.: WO2015/062782
PCT Pub. Date: May 7, 2015

(65) Prior Publication Data
US 2016/0265392 A1   Sep. 15, 2016

(30) Foreign Application Priority Data

Oct. 30, 2013   (FR) .................................... 13 60610

(51) Int. Cl.
| *F01K 7/16*   | (2006.01) |
| *F01K 11/02*  | (2006.01) |
| *F01K 17/00*  | (2006.01) |
| *F01K 25/04*  | (2006.01) |
| *F01K 25/10*  | (2006.01) |
| *F01K 23/02*  | (2006.01) |

(52) U.S. Cl.
CPC .............. *F01K 17/005* (2013.01); *F01K 7/16* (2013.01); *F01K 11/02* (2013.01); *F01K 23/02* (2013.01); *F01K 25/04* (2013.01); *F01K 25/106* (2013.01); *Y02E 10/34* (2013.01)

(58) Field of Classification Search
CPC .......... F01K 7/16; F01K 11/02; F01K 17/005; F01K 23/02; F01K 25/04; F01K 25/106; Y02E 10/34
See application file for complete search history.

(56) References Cited

U.S. PATENT DOCUMENTS

| 8,656,720 B1 * | 2/2014 | Hardgrave ................ F01K 7/34 60/641.2 |
| 2011/0309635 A1 | 12/2011 | Sardo |
| 2015/0052894 A1 | 2/2015 | Teixeira et al. |

FOREIGN PATENT DOCUMENTS

| FR | 2981129 A1 | 4/2013 |
| WO | 2010/070242 A2 | 6/2010 |
| WO | 2013/050666 A1 | 4/2013 |

OTHER PUBLICATIONS

International Search Report for PCT/EP2014/069805 dated Dec. 5, 2014; English translation submitted herewith (5 Pages).

* cited by examiner

*Primary Examiner* — Audrey K Bradley
(74) *Attorney, Agent, or Firm* — Fitch, Even, Tabin & Flannery LLP (57) ABSTRACT

The invention relates to a thermal to energy conversion method and system using a Rankine cycle equipped with a heat pump, wherein heat pump (2) is integrated in the Rankine cycle.

30 Claims, 7 Drawing Sheets

THERMAL TO MECHANICAL ENERGY CONVERSION METHOD USING A RANKINE CYCLE EQUIPPED WITH A HEAT PUMP

CROSS REFERENCE TO RELATED APPLICATIONS

Reference is made to PCT/EP2014/069805, filed Sep. 17, 2014, and French Patent Application No. 13 60610 filed Oct. 30, 2013, which applications are incorporated herein by reference in their entirety.

BACKGROUND OF THE INVENTION

Field of the Invention

Field of the Invention The present invention relates to the field of thermal to mechanical energy conversion and in particular for ocean thermal energy conversion (OTEC).

Description of the Prior Art

Figure 1:
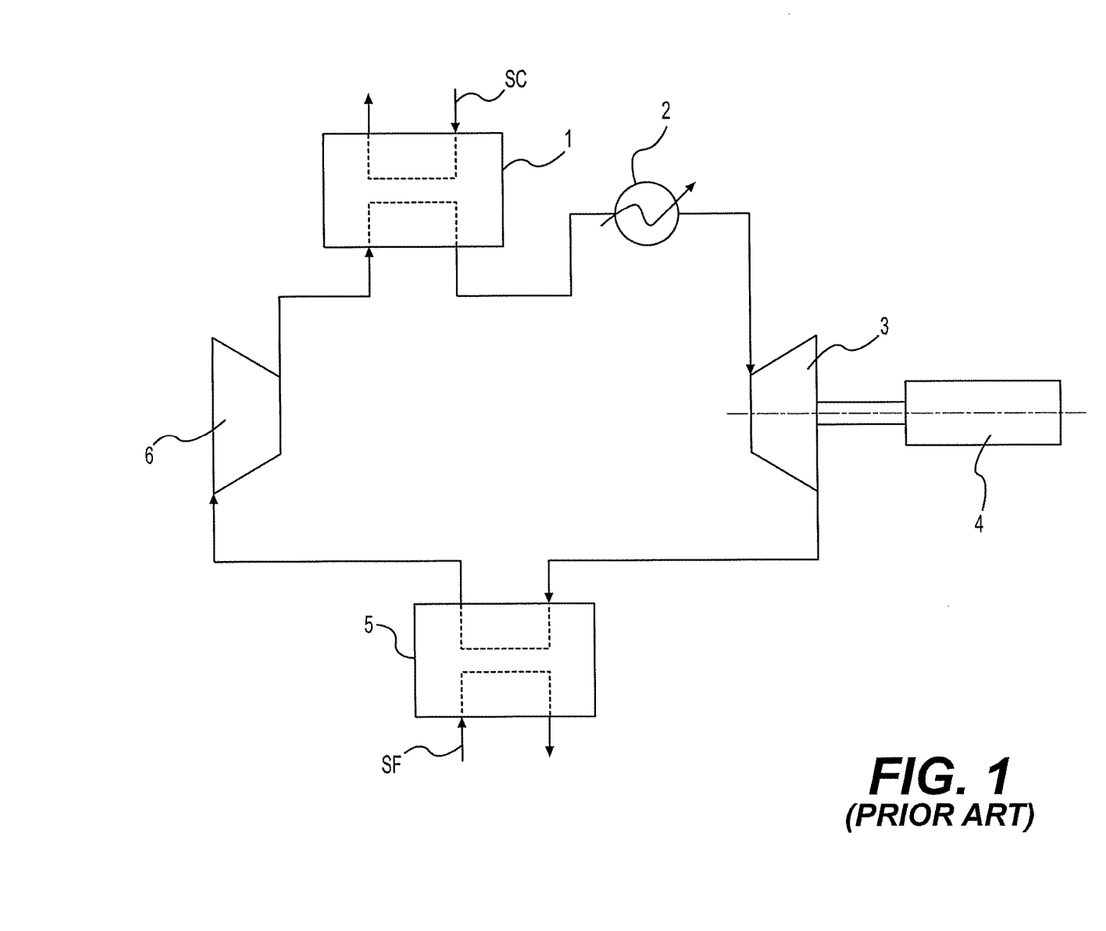
FIG. 1, which is already described, is a block diagram of an OTEC plant operating on a Rankine cycle according to the prior art.

Conventional OTEC plants generally operate on a Rankine cycle. French Patent Application 2,981,129 describes the use of a Rankine cycle in the case of OTEC. FIG. 1 shows a prior art block diagram of an OTEC plant operating with a Rankine cycle and comprising an exchanger 1 as the heat source SC (surface ocean water) and a secondary heat source 2. The secondary heat source allows the thermodynamic cycle to be improved. The system comprises an exchanger 5 as the cold source SF from cold seawater taken at depth. The circuit of the motive fluid, ammonia in the present example, comprises a pump 6 and a turbine 3 driving a generator 4 for conversion to electrical energy.

French Patent Application 2,981,129 also discloses a variant of this cycle with a heat pump as the secondary heat source for overheating the working fluid. Addition of a heat pump notably allows the net power generated by the system to be increased. A heat pump (PAC) is a thermodynamic device allowing transfer of heat from a cooler medium, or of the same temperature (and thus to cool it), to a warmer medium, or of the same temperature (and thus to heat it), whereas heat diffuses naturally from the warmest to the coolest medium until equality of temperature is reached. Therefore, for the Rankine cycle, several equipments are added to the pump which are a heat source-working fluid exchanger, a compressor, an exchanger between the working fluid of the heat pump and the working fluid of the Rankine cycle, and a valve.

Figure 2:
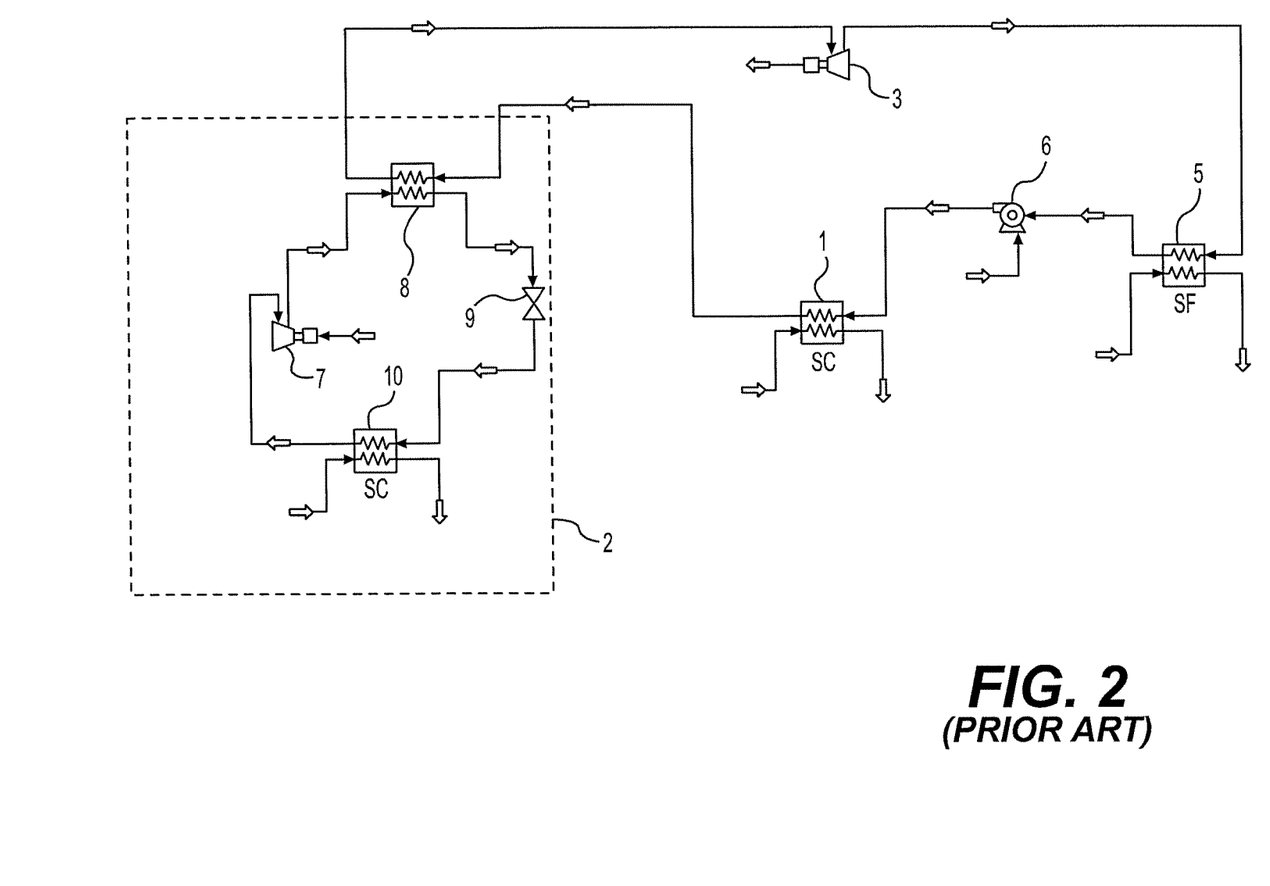
FIG. 2, which is already described, is a diagram of an OTEC plant operating on a Rankine cycle equipped with a heat pump according to the prior art.

FIG. 2 illustrates a prior art example of an OTEC plant operating on a Rankine cycle equipped with a heat pump. The circuit of the Rankine cycle is identical to the previous one and comprises an exchanger 1, a turbine 3, an exchanger 5 and a pump 6, secondary heat source 2 having of a heat pump. The heat pump comprises an exchanger 10 for heat exchange with the warm heat source, a compressor 7, an exchanger 8 for heat exchange with the working fluid of the Rankine cycle and a valve 9. Heat exchanger 10 undergoes corrosion and may get clogged up due to biofouling (incrustations on solid matter immersed in an aquatic environment from living species or developed by aquatic living species such as bacteria, protists, plants and animals. This equipment therefore requires significant maintenance.

SUMMARY OF THE INVENTION

The invention relates to a thermal to mechanical energy conversion method wherein a working fluid is circulated in a closed circuit comprising a circuit according to a Rankine cycle equipped with a heat pump for heating the working fluid vaporized in the Rankine cycle circuit. For the method, the working fluid of the Rankine cycle circuit is circulated in the circuit of the heat pump.

The invention relates to a thermal to mechanical energy conversion method and system using a Rankine cycle equipped with a heat pump, wherein the heat pump is integrated in the Rankine cycle. Thus, a single working fluid is used for the circuit of the Rankine cycle and the circuit of the heat pump, and the circuit of the heat pump requires no exchanger for heat exchange with the heat source.

A particular application of the present invention is to ocean thermal energy and the use of energy obtained from the temperature difference existing in tropical and subtropical regions between surface ocean waters and deep ocean waters, in particular at depths of the order of 1000 m. Surface waters are used for the heat source and deep waters for the cold source of a motive thermodynamic cycle. The temperature difference between the heat source and the cold source is low and the expected energy yields are also low.

According to the invention, the vaporized working fluid is separated into two portions which a first portion intended for conversion to mechanical energy by the Rankine cycle circuit and a second portion intended for the heat pump.

Advantageously, the first portion is mixed after the stage of conversion to mechanical energy in the Rankine cycle circuit with at least part of the second portion.

Preferably, the following stages are carried out:
a) vaporizing the working fluid by thermal exchange with a first heat source;
b) separating the vaporized working fluid into two portions;
c) heating a first portion by heat exchange with a previously compressed second portion;
d) converting part of the thermal energy contained in the first portion into mechanical energy;
e) re-forming at least part of the working fluid by mixing at least part of the first and second portions with the second portion being previously expanded;
f) condensing at least part of the re-formed working fluid by heat exchange with a second heat source; and
g) compressing the condensed working fluid.

According to an embodiment of the invention, the second portion is separated, upstream from the re-forming part of the working fluid, into a liquid phase and a gas phase with the gas phase of the second portion being mixed with the first portion during partially re-forming the working fluid, and the liquid phase of the second portion being mixed with the condensed working fluid.

In a variant, the partially re-formed working fluid is separated into a liquid phase and a gas phase with the gas phase of the working fluid being condensed during the condensation stage, and the liquid phase of the working fluid being mixed with the condensed working fluid.

According to the invention, the heat sources are seawater taken at different depths.

Advantageously, the working fluid comprises ammonia.

Furthermore, the invention relates to a thermal to mechanical energy conversion system comprising a closed circuit wherein a working fluid circulates, the closed circuit comprising a Rankine cycle circuit equipped with a heat pump for heating the vaporized working fluid in the Rankine cycle circuit. In the system, the working fluid of the Rankine cycle circuit circulates in the circuit of the heat pump.

According to the invention, the closed circuit comprises a first separator for separating the working fluid into two portions with a first portion being converted into mechanical energy by the Rankine cycle circuit and a second portion being for the circuit of the heat pump.

Advantageously, the closed circuit comprises, downstream from a means for conversion to mechanical energy in the Rankine cycle circuit, a first mixer for mixing the first portion with at least part of the second portion.

Preferably, the closed circuit comprises successively:
a first heat exchanger for vaporizing the working fluid with a first heat source;
a separator for separating the vaporized working fluid into two portions;
a second heat exchanger for heating a first portion with a second portion compressed by a compressor;
a turbine for converting part of the thermal energy contained in the first portion to mechanical energy;
a first mixer for mixing at least part of the first and second portions so as to re-form at least part of the working fluid and the second portion being expanded by an expansion means;
a third heat exchanger for condensing at least part of the working fluid by a second heat source; and
a pump for compressing the condensed working fluid.

Advantageously, the expansion means comprises a valve or a two-phase pump.

According to an embodiment of the invention, the closed circuit comprises, upstream from the first mixer, a second separator for separating the liquid and gas phases of the second portion and, downstream from the third exchanger, a second mixer for mixing the liquid phase with the working fluid at the third exchanger outlet, and the first mixer mixing the gas phase of the second portion with the first portion.

According to a variant embodiment of the invention, the closed circuit comprises, downstream from the first mixer, a third separator for separating the liquid and gas phases of the working fluid at an outlet of the first mixer and, downstream from the third exchanger, a second mixer for mixing the liquid phase with the working fluid at an outlet of the third exchanger with the third exchanger cooling the aqueous phase of the working fluid.

According to the invention, the working fluid comprises ammonia.

Furthermore, the heat sources can be seawater taken at different depths.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

The invention relates to a method and to a system for converting thermal energy from heat sources to mechanical energy. The heat sources can be for example seawater taken at different depths with the warm source (28° C. for example) taken at the sea surface, and the cold source (4° C. for example) taken at depths close to or greater than 1000 m.

The method and the system are based on the implementation of a thermodynamic cycle using a working fluid. For example, the working fluid can be ammonia ($NH_3$) indeed, ammonia can be vaporized through heat exchange with a warm source notably seawater because, within a reasonable pressure range, the temperature of the surface ocean water is high enough to allow ammonia vaporization. Similarly, the temperature of the cold source allows condensation thereof. Alternatively, the working fluid can be any organic fluid meeting the temperature/pressure criteria depending on the temperatures of the heat sources.

According to the invention, the thermodynamic cycle corresponds to a Rankine cycle equipped with a heat pump.

A Rankine cycle (FIG. 1) is a cycle wherein the working fluid is successively subjected to the following stages:
vaporization, for example by heat exchange with a warm source,
expansion, for example by a turbine that converts thermal energy to mechanical energy,
condensation, for example by frigories exchange with a cold source, and
compression, for example by a pump.

A heat pump (PAC) is a thermodynamic device allowing transfer heat of from a cooler medium, or of same temperature (and thus to cool it), to a warmer medium, or of same temperature (and thus to heat it), whereas heat diffuses naturally from the warmest to the coolest medium until equality of temperature. Therefore, a heat pump comprises several equipments (FIG. 2) which are an exchanger for heat exchange between a heat source and a working fluid, a compressor, an exchanger between the working fluid of the heat pump and the fluid to be heated, and a valve for expanding the working fluid of the heat pump. Adding a heat pump to the Rankine cycle allows overheating the vaporized working fluid before passing it into the turbine. Thus, the net power generated by this method (Rankine cycle+heat pump) is increased in relation to the power generated by the Rankine cycle alone. Net power is understood to be the power generated at the turbine minus the powers consumed by the pump or the compressor.

According to the invention, the heat pump is integrated into the Rankine cycle with the same working fluid being circulated in the components of the circuit corresponding to the Rankine cycle and in those corresponding to the heat pump. The working fluid is thus shared and unique for the thermodynamic cycle of the invention. Thus, the part of the circuit corresponding to the heat pump does not require using a heat exchanger with a warm source (subjected to corrosion and biofouling). Advantageously, the working fluid is separated into two portions with a first portion essentially intended for the thermodynamic stages of the Rankine cycle and a second portion essentially intended for the thermodynamic stages of the heat pump. A working fluid portion is understood to be a part of the working fluid that is used only in part of the thermodynamic circuit according to the invention. The working fluid is subsequently re-formed by means allowing implementation of the mixing and condensation stages, and optionally means allowing implementation of the liquid and gas phase separation stages.

According to a first embodiment of the invention, the fluid is separated into two portions after the stage of vaporization of the working fluid in the Rankine cycle with part of the gaseous working fluid stream being extracted at the evaporator outlet.

Figure 3:
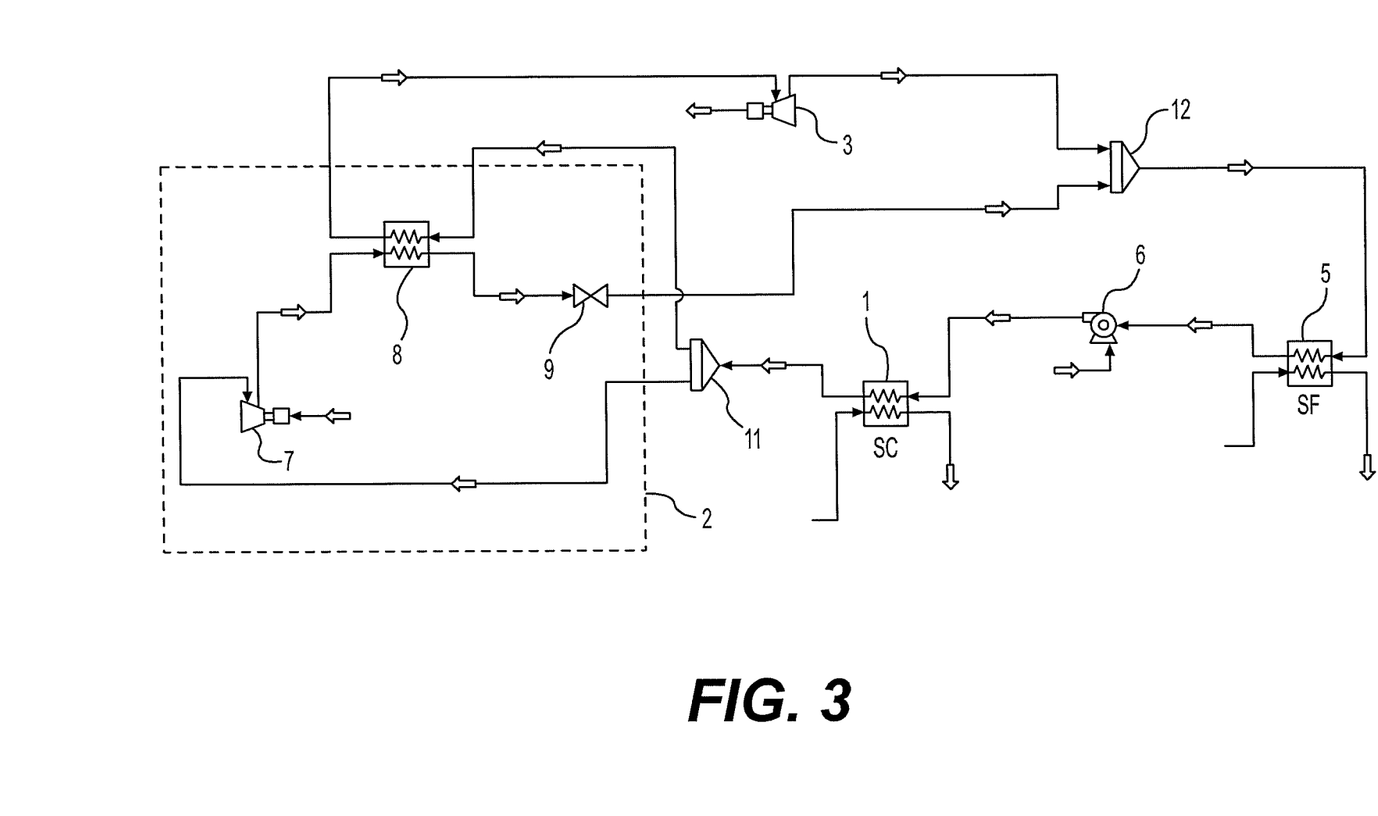
FIG. 3 is a diagram of a thermal energy conversion system operating on a Rankine cycle equipped with a heat pump according to a first embodiment of the invention.

FIG. 3 illustrates this first embodiment of the invention. Elements identical or similar to the prior art embodiments of FIGS. 1 and 2 have the same reference signs.

The working fluid is vaporized in a first heat exchanger 1, also referred to as evaporator, through heat exchange with a warm source SC, notably surface ocean water. The vaporized working fluid is separated into two portions in a first separator or splitter 11.

The first working fluid portion (in gas form) is overheated in a second heat exchanger 8, also referred to as over heater, by means of the second portion. The thermal energy of the first working fluid portion is then converted to mechanical energy by turbine 3.

The second working fluid portion (in gas form) is compressed in a compressor 7 and subsequently used for heating the first portion by a second heat exchanger 8. At the outlet of second exchanger 8, the second portion is expanded, for example by a valve 9. The pressure at the outlet of valve 9 is adjusted at the pressure at the outlet of turbine 3 so that the two streams (portions) have the same pressure.

The first working fluid portion leaving turbine 3 and the second working fluid portion are then mixed together in mixer 12 to re-form the working fluid.

The re-formed working fluid is then condensed by a third heat exchanger 5, which is also referred to as condenser, by heat exchange with a cold source SF, notably seawater taken at depth. The condensed working fluid is then compressed for example in a pump 6 prior to being again vaporized in first heat exchanger 1.

The second embodiment of the invention differs from the first one in that only the gas phase of the second working fluid portion is mixed with the first working fluid portion at the turbine outlet. Indeed, the second portion at the valve outlet is made up of a liquid and gaseous combination. It is therefore not necessary to cool the liquid phase in the condenser. The liquid and gas phases of the second portion are therefore separated upstream from the mixture. The collected liquid is mixed with the liquid working fluid at the condenser outlet.

Figure 4:
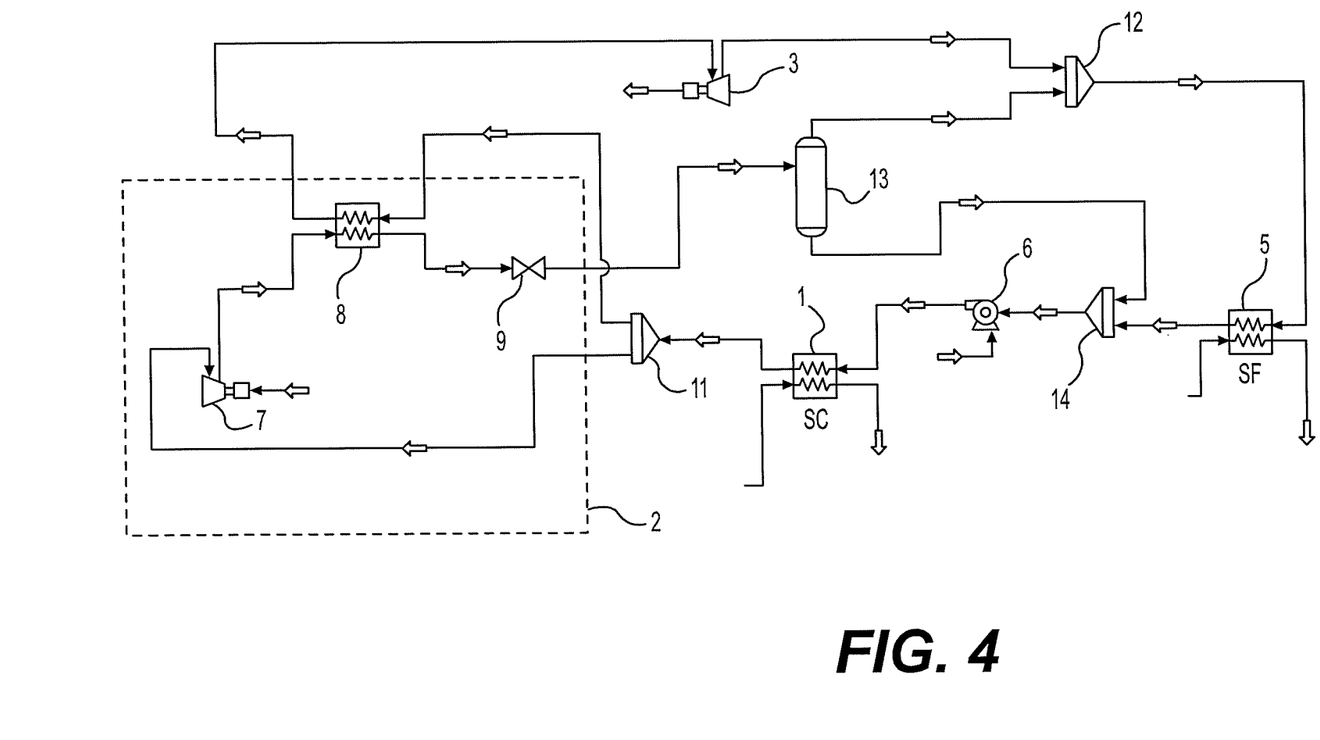
FIG. 4 is a diagram of a thermal energy conversion system operating on a Rankine cycle equipped with a heat pump according to a second embodiment of the invention.

FIG. 4 illustrates this second embodiment of the invention. Elements similar to the first embodiment are not described.

The second working fluid portion at the outlet of valve 9 is separated into a liquid phase and a gas phase in a second separator 13 which may be a flash drum for example. The gas phase of the second portion at the outlet of separator 13 is mixed with the first portion at the outlet of turbine 3 in mixer 12. The working fluid which is re-formed is condensed in a third heat exchanger 5. The liquid phase of the second portion at the outlet of separator 13 is mixed in a second mixer 14 with the condensed working fluid at the outlet of third heat exchanger 5. Thus, all of the working fluid circulates in liquid form at the outlet of second mixer 14.

The third embodiment of the invention differs from the first in that only the gas phase of the re-formed working fluid is condensed. Indeed, the proportion of liquid at the turbine outlet can be significant. It is not necessary for the liquid phase to be condensed and it may therefore be judicious to use a flash drum after mixing the two streams.

Figure 5:
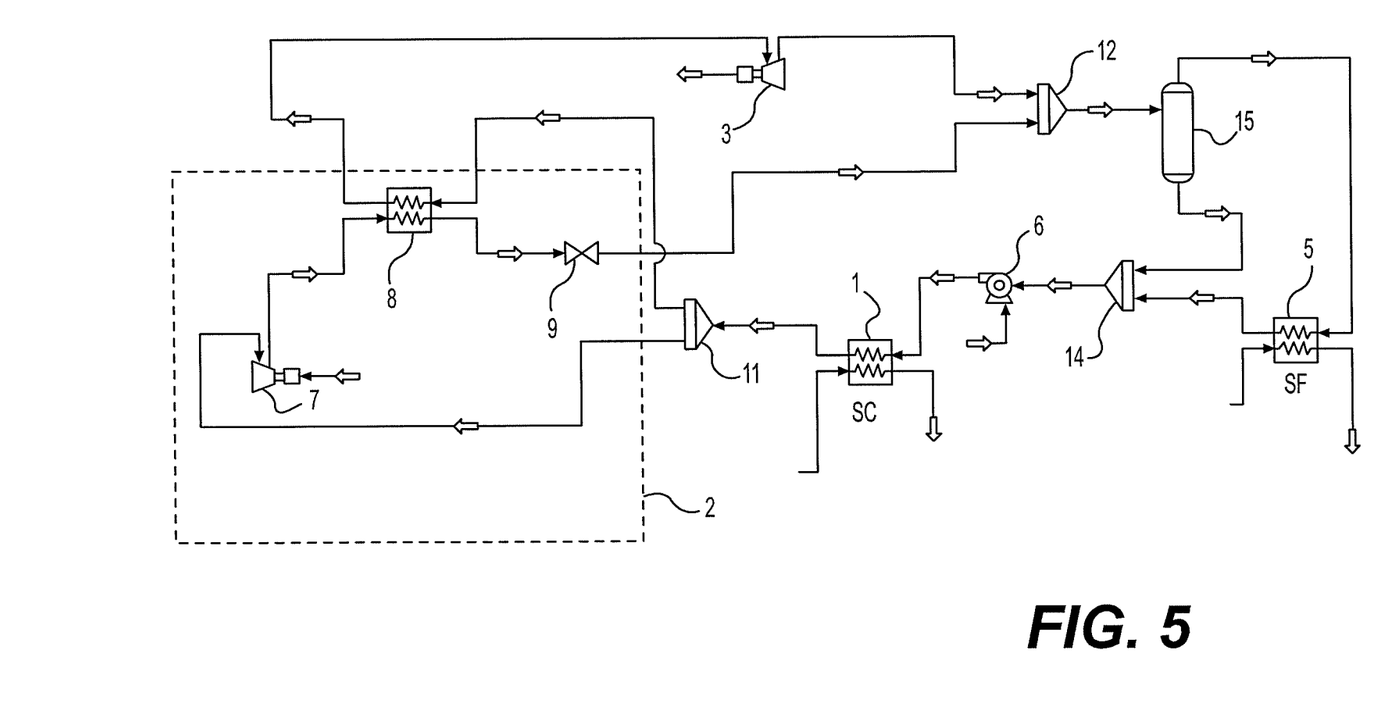
FIG. 5 is a diagram of a thermal energy conversion system operating on a Rankine cycle equipped with a heat pump according to a third embodiment of the invention.

FIG. 5 illustrates this third embodiment of the invention. Elements similar to the first two embodiments are not described.

The re-formed working fluid at the outlet of first mixer 12 is separated into a liquid phase and a gas phase by means of a third separator 15, notably a flash drum. The gas phase of the working fluid at the outlet of third separator 15 is condensed in third heat exchanger 5. The liquid phase of the working fluid at the outlet of third separator 15 is mixed in a second mixer 14 with the condensed working fluid at the outlet of third heat exchanger 5. Thus, all of the working fluid circulates in liquid form at the outlet of second mixer 14.

The fourth embodiment of the invention combines the second and third embodiments. Only the gas phase of the second working fluid portion is mixed with the first working fluid portion at the turbine outlet and only the gas phase of the re-formed working fluid is condensed.

Figure 6:
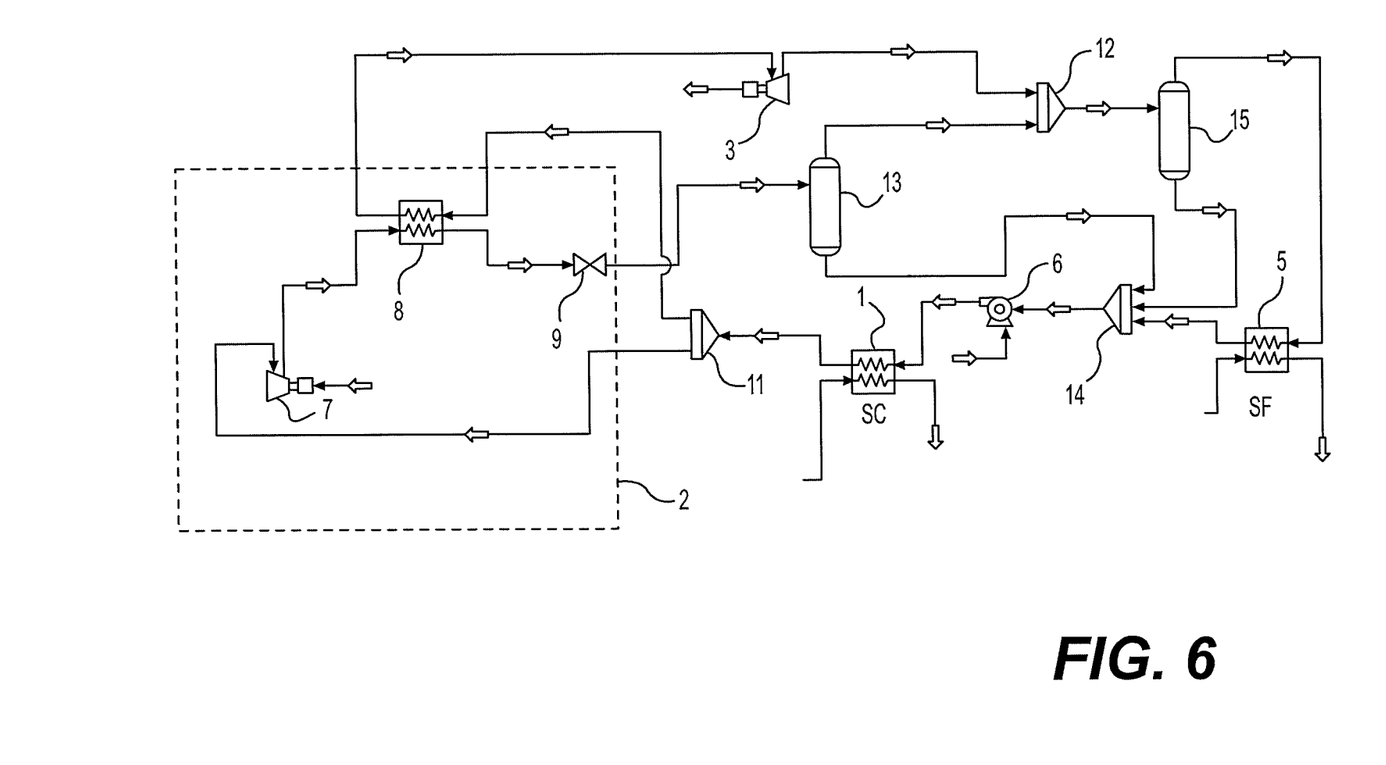
FIG. 6 is a diagram of a thermal energy conversion system operating on a Rankine cycle equipped with a heat pump according to a fourth embodiment of the invention.

FIG. 6 illustrates the fourth embodiment of the invention. Elements similar to the first three embodiments are not described.

The second working fluid portion at the outlet of valve 9 is separated into a liquid phase and a gas phase in a second separator 13 which may be a flash drum for example. The gas phase of the second portion at the outlet of separator 13 is mixed with the first portion at the outlet of turbine 3 in mixer 12.

The partially re-formed working fluid at the outlet of first mixer 12 is separated into a liquid phase and a gas phase by a third separator 15 which may be a flash drum for example. The gas phase of the working fluid at the outlet of third separator 15 is condensed in third heat exchanger 5.

The liquid phase of the second portion at the outlet of separator 13 is mixed in a second mixer 14 with the liquid phase of the partially re-formed working fluid in first mixer 12 and with the condensed working fluid at the outlet of third heat exchanger 5. Thus, all of the working fluid circulates in liquid form at the outlet of second mixer 14.

Figure 7:
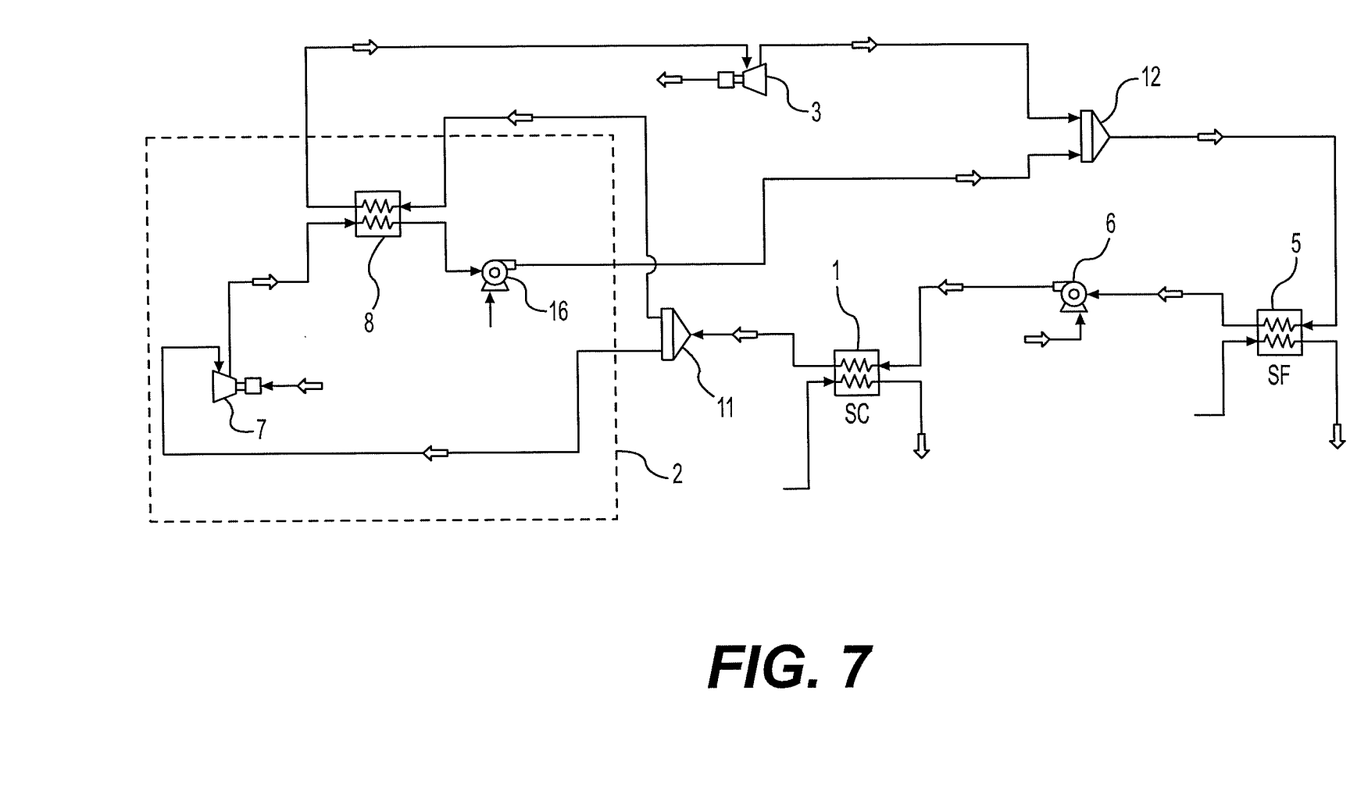
FIG. 7 is a diagram of a thermal energy conversion system operating on a Rankine cycle equipped with a heat pump according to a variant of the first embodiment of the invention.

According to a variant embodiment of the invention compatible with all the embodiments described above, expansion of the second portion in the circuit relative to the heat pump can be performed by means of a two-phase pump. The two-phase pump allows increasing the net power generated by the thermodynamic cycle according to the invention. FIG. 7 illustrates this variant for the first embodiment. Elements similar to the four embodiments are not described.

In this circuit, valve 9 of the heat pump is replaced by a two-phase pump 16. The method and the system according to the invention are particularly suited for use as an OTEC plant with the warm source being seawater taken at the surface and the cold source being seawater taken at depth (1000 m for example).

Application Examples

In order to show the use of the method and of the system according to the invention, simulations were performed for various embodiments of the invention and for two embodiments of the prior art.

To study and compare the different methods, the working fluid is considered to be ammonia (NH3) and we set the following parameters are set:
Warm water (warm source SC)
Temperature 28° C.
Cold water (cold source SF)
Temperature 4° C.
Rankine cycle without heat pump (prior art of FIG. 1)
NH3 flow rate in turbine 3: 100 kg/s
Heat pump 2
NH3 flow rate: 4 kg/s.

It can be noted that, under such conditions, the ammonia is dry at the turbine outlet. For the cycles with integrated heat pump according to the invention, splitter 11 is so adjusted that the ammonia flow rate in the turbine is the same as for the Rankine cycle with or without a heat pump, i.e. 100 kg/s.

For all the cycles, the warm or cold water flow rates are so adjusted so that the pinch is slightly above 2° C. For overheater 8, the pressure at the compressor outlet is adjusted so as to have the same 2° C. pinch.

The various methods simulated are:
the Rankine cycle alone, denoted by Cycle 1, as illustrated in FIG. 1 (prior art)
the thermodynamic cycle of FIG. 2 with a Rankine cycle and a heat pump, denoted by Cycle 2 (prior art)
the first, second and third embodiments of the invention, as illustrated in FIGS. 3 to 5 and denoted by Cycles 3, 4 and 5 respectively.

Table 1 summarizes the powers consumed and generated in the various methods and their comparison in relation to the Rankine cycle.

TABLE 1

Comparison of the consumed and generated powers

| Powers | Cycle 1 | Cycle 2 | Cycle 3 | Cycle 4 | Cycle 5 |
|---|---|---|---|---|---|
| Pump SC (kW) | 431 | 464 | 464 | 464 | 464 |
| Pump SF (kW) | 319 | 557 | 574 | 560 | 570 |
| Pump 6 (kW) | 54 | 65 | 67 | 67 | 67 |
| Compressor 7 (kW) | | 578 | 578 | 578 | 578 |
| Pump PAC (kW) | | 0.8 | | | |
| Turbine 3 (kW) | 4046 | 5406 | 5406 | 5406 | 5406 |
| Net power (kW) | 3242 | 3741 | 3726 | 3736 | 3726 |
| Gain/Cycle 1 (%) | | 15.4 | 14.8 | 15.2 | 14.9 |

It can be observed that addition of a heat pump allows generation around 500 kW more in relation to the Rankine cycle, that is a power gain of around 15%.

Integration of the heat pump PAC according to the invention (Cycles 3, 4 and 5) in the Rankine cycle causes a slight reduction in the gain obtained in Cycle 2 (according to the prior art) due to the increase in power of the cold water pump. However, the second embodiment of the invention allows to practically get back to the same generated power as the Rankine cycle with heat pump PAC of Cycle 2.

On the other hand, integration of the heat pump PAC according to the invention in the cycle has little effect on the sizing of the exchanger with the cold source (condenser) and has no impact on the vaporizer and the overheater.

A second series of simulations was carried out by replacing valve 9 by a two-phase pump. Table 2 shows the results of these simulations:

TABLE 2

Comparison of the consumed and generated powers with a two-phase turbine

| Powers | Cycle 1 | Cycle 2 | Cycle 3 | Cycle 4 | Cycle 5 |
|---|---|---|---|---|---|
| Pump SC (kW) | 431 | 464.31 | 464.31 | 464.31 | 464.31 |
| Pump SF (kW) | 319 | 557.23 | 570.26 | 560.48 | 570.26 |
| Pump 6 (kW) | 54 | 64.52 | 67.10 | 67.0 | 67.10 |
| Compressor 7 (kW) | | 578.18 | 578.15 | 578.15 | 578.15 |
| Pump PAC (kW) | | 0.80 | | | |
| Multiphase turbine (kW) | | 5.26 | 6.85 | 6.85 | 6.85 |
| Turbine 3 (kW) | 4046 | 5405.68 | 5405.66 | 5405.66 | 5405.66 |
| Net power (kW) | 3242 | 3745.91 | 3732.69 | 3742.46 | 3732.69 |
| Gain 1 (%) | | 15.5 | 15.1 | 15.4 | 15.1 |

With the two-phase turbine, the shaft power generated in this example is 6.85 kW.

Table 3 allows assessment of the generated power gain:

TABLE 3

Comparison of the gains with a two-phase pump in relation to the same cycles provided with a valve

| | Cycle 2 | Cycle 3 | Cycle 4 | Cycle 5 |
|---|---|---|---|---|
| Net power gain (kW) | 5.26 | 10.11 | 6.85 | 6.85 |
| Gain (%) | 0.2 | 0.3 | 0.2 | 0.2 |

This gain is low but revealing. Furthermore, addition of a two-phase turbine provides no particular change in the parameters dimensioning the exchangers. This conclusion derives from the fact that, given the conditions under which it operates in this example, the two-phase turbine has little effect on the thermodynamic conditions of the working fluid at the outlet.

Several variants of the method according to the invention, were studied involving overheating of a Rankine cycle with a heat pump. These variants allow without the seawater-heat pump, a working fluid exchanger. Indeed, although this exchanger is small in size in relation to the main exchangers of the Rankine cycle, it has corrosion and biofouling problems.

The simulations of these various methods show that the integration according to the invention improves substantially the Rankine cycle by the simple addition of a heat pump to the Rankine cycle.

Furthermore, addition of a two-phase turbine in these methods allows improvement of the efficiency by several percentage points without requiring any particular change in the design of the main exchangers.

The invention claimed is:
1. A thermal to mechanical energy conversion method comprising:
  circulating a working fluid in a circuit which operates as a Rankine closed loop and includes a heat pump which heats the working fluid that is vaporized, heated and inputted into a turbine in the Rankine closed loop cycle to produce the mechanical energy;
  separating the vaporized working fluid flowing in the Rankine closed loop into a first portion and a second portion;

prior to inputting the first portion into the turbine, compressing the second portion with a compressor within the heat pump to heat the second portion, and flowing the first portion and the heated second portion through a heat exchanger to heat the first portion; and inputting the heated first portion into the turbine to produce the mechanical energy.

2. A method as claimed in claim 1, comprising:

taking seawater from heat sources which are respectively seawater taken at different depths with a first heat source at a shallower depth being used for vaporizing the working fluid and a second heat source at a greater depth being used for condensing the working fluid.

3. A method as claimed in claim 1, wherein the working fluid comprises ammonia.

4. A method as claimed in claim 1, wherein:

the first portion is mixed with at least part of the second portion after being inputted into the turbine.

5. A method as claimed in claim 4, wherein the working fluid comprises ammonia.

6. A method as claimed in claim 4, comprising:

vaporizing the working fluid by thermal exchange with a first heat source;

flowing the first portion through the turbine to produce the mechanical energy;

partially re-forming the working fluid by mixing at least part of the first and second portions after the first portion has flowed through the turbine;

condensing at least part of the re-formed working fluid by heat exchange with a second heat source; and compressing the working fluid after condensing at least part of the re-formed working fluid.

7. A method as claimed in claim 6, comprising:

taking seawater from heat sources which are respectively seawater taken at different depths with a first heat source at a shallower depth being used for vaporizing the working fluid and a second heat source at a greater depth being used for condensing the working fluid.

8. A method as claimed in claim 6, comprising:

upstream from re-forming part of the working fluid, separating the second portion into a liquid phase and a gas phase;

mixing the gas phase of the second portion with the first portion to partially re-form the working fluid; and mixing the liquid phase of the second portion with a condensed portion of the working fluid to convert the working fluid into liquid.

9. A method as claimed in claim 8, comprising:

taking seawater from heat sources which are respectively seawater taken at different depths with a first heat source at a shallower depth being used for vaporizing the working fluid and a second heat source at a greater depth being used for condensing the working fluid.

10. A method as claimed in claim 6, comprising:

separating the working fluid into a liquid phase and a gas phase with the gas phase of the working fluid being condensed by the condensing (SF) of the working fluid; and mixing the liquid phase of the working fluid with the condensed working fluid to convert all of the working fluid into liquid.

11. A method as claimed in claim 10, comprising:

taking seawater from heat sources which are respectively seawater taken at different depths with a first heat source at a shallower depth being used for vaporizing the working fluid and a second heat source at a greater depth being used for condensing the working fluid.

12. A method as claimed in claim 1, comprising:

vaporizing the working fluid by thermal exchange with a first heat source;

flowing the first portion through the turbine to produce the mechanical energy;

partially re-forming the working fluid by mixing at least part of the first and second portions after the first portion has flowed through the turbine;

condensing at least part of the re-formed working fluid by heat exchange with a second heat source; and compressing the working fluid after condensing at least part of the re-formed working fluid.

13. A method as claimed in claim 12, comprising:

taking seawater from heat sources which are respectively seawater taken at different depths with a first heat source at a shallower depth being used for vaporizing the working fluid and a second heat source at a greater depth being used for condensing the working fluid.

14. A method as claimed in claim 12, wherein the working fluid comprises ammonia.

15. A method as claimed in claim 12, comprising:

upstream from re-forming part of the working fluid, separating the second portion into a liquid phase and a gas phase;

mixing the gas phase of the second portion with the first portion to partially re-form the working fluid; and mixing the liquid phase of the second portion with a condensed portion of the working fluid to convert the working fluid into liquid.

16. A method as claimed in claim 15, comprising:

taking seawater from heat sources which are respectively seawater taken at different depths with a first heat source at a shallower depth being used for vaporizing the working fluid and a second heat source at a greater depth being used for condensing the working fluid.

17. A method as claimed in claim 15, wherein the working fluid comprises ammonia.

18. A method as claimed in claim 12, comprising:

separating the working fluid into a liquid phase and a gas phase with the gas phase of the working fluid being condensed by the condensing (SF) of the working fluid; and mixing the liquid phase of the working fluid with the condensed working fluid to convert all of the working fluid into liquid.

19. A method as claimed in claim 18, comprising:

taking seawater from heat sources which are respectively seawater taken at different depths with a first heat source at a shallower depth being used for vaporizing the working fluid and a second heat source at a greater depth being used for condensing the working fluid.

20. A method as claimed in claim 18, wherein the working fluid comprises ammonia.

21. A thermal to mechanical energy conversion system comprising:

a Rankine cycle closed loop which circulates a working fluid and includes a heat pump which heats the working fluid which is inputted into a turbine to produce mechanical energy;

a separator for separating vaporized working fluid flowing in the Rankine closed loop cycle into first and second portions;

a compressor which compresses the second portion to heat the second portion; and a heat exchanger through which the first portion and the heated second portion flows to heat the first portion prior to inputting the first portion into the turbine to produce the mechanical energy.

22. A system as claimed in claim 21, wherein the closed circuit comprises:
a first heat exchanger for vaporizing the working fluid with a first heat source which is sea water from a shallower depth;
a first mixer for mixing at least part of the first and second portions to re-form the working fluid after the working fluid passes through the turbine;
a valve or two-phase pump for expanding the second portion before mixing with the first mixer; and
a second heat exchanger for condensing at least part of the working fluid by heat exchange from a second heat source which is sea water from a sea water depth greater than the shallower depth.

23. A system as claimed in claim 21, wherein the closed loop comprises:
a separator located upstream from a first mixer for separating liquid and gas phases of the second portion and a mixer located downstream from the separator for mixing a liquid phase at an outlet the separator with an outlet of a heat exchanger coupled to cold ocean water for condensing a gas phase of the working fluid.

24. A system as claimed in claim 21, wherein the working fluid comprises ammonia.

25. A system as claimed in claim 21, comprising:
heat sources which are respectfully seawater taken at a shallower ocean depth and seawater taken at an ocean depth greater than the shallower ocean depth for respectively vaporizing the working fluid and condensing the working fluid.

26. A system as claimed in claim 21, wherein the second portion is expanded by a two-phase pump.

27. A system as claimed in claim 26, comprising:
heat sources which are respectfully seawater taken at a shallower ocean depth and seawater taken at an ocean depth greater than the shallower ocean depth for respectively vaporizing the working fluid and condensing the working fluid.

28. A system as claimed in claim 21, wherein the closed circuit comprises:
a first mixer for mixing the first portion with at least part of the second portion which is downstream from the turbine to reform at least part of the working fluid.

29. A system as claimed in claim 28, wherein the closed circuit comprises:
a first heat exchanger for vaporizing the working fluid with a first heat source which is sea water from a shallower depth;
a valve or two-phase pump for expanding the second portion before mixing with the first mixer; and
a second heat exchanger for condensing at least part of the working fluid by heat exchange from a second heat source which is sea water from a sea water depth greater than the shallower depth.

30. A system as claimed in claim 28, comprising:
heat sources which are respectfully seawater taken at a shallower ocean depth and seawater taken at an ocean depth greater than the shallower ocean depth for respectively vaporizing the working fluid and condensing the working fluid.

* * * * *